United States Patent [19]

Kellner

[11] 4,244,433
[45] Jan. 13, 1981

[54] SAFETY MECHANISM FOR A RAISE DRILL
[75] Inventor: Jackson M. Kellner, Midland, Tex.
[73] Assignee: Smith International, Inc., Newport Beach, Calif.
[21] Appl. No.: 973,007
[22] Filed: Dec. 26, 1978
[51] Int. Cl.³ .............................................. E21B 9/24
[52] U.S. Cl. ...................................... 175/344; 175/53
[58] Field of Search ................. 175/53, 294, 344, 406; 285/117; 64/27 NM

[56] References Cited

U.S. PATENT DOCUMENTS

| | | | |
|---|---|---|---|
| 2,301,296 | 11/1942 | Laurent | 285/117 |
| 2,457,507 | 12/1948 | Strachovsky | 64/27 NM X |
| 4,076,087 | 2/1978 | Chuply et al. | 175/53 X |
| 4,142,593 | 3/1979 | Dixon et al. | 175/53 |

Primary Examiner—James A. Leppink
Assistant Examiner—Richard F. Favreau
Attorney, Agent, or Firm—Robert M. Vargo

[57] ABSTRACT

A raise bit is disclosed for enlarging a pilot hole into a larger diameter hole by disintegrating the earth formations surrounding the pilot hole. The raise bit includes a removable drive stem for enabling the raise bit to be transported through small drifts. The drive stem is attached to a thrust bearing plate which, in turn, is interconnected to a main bit body. The bit body extends around the drive stem and includes a plurality of rolling cutters for contacting and disintegrating the earth formations surrounding the pilot hole. The interconnection between the thrust bearing plate and the bit body is accomplished by means of a flexible shock absorbing member which is bonded to the plate and bit body. This flexible interconnection functions to absorb the bending and impact type loads acting on the bit body. A safety mechanism is provided to limit the amount of relative axial movement of the flexibly interconnected members should the bonded interconnections separate. The safety mechanism includes a lug connected to and extending downwardly from the main bit body. The lug extends around the thrust bearing plate with a small clearance therebetween in order to retain the interconnected members should the flexible bonded connection break. The safety mechanism further includes a stop located on the thrust bearing plate adjacent the lug. Should the bonded interconnections break, the stop is adapted to engage the lug as the thrust plate rotates to impart a torque force through the lug in order to drivingly rotate the bit body.

1 Claim, 2 Drawing Figures

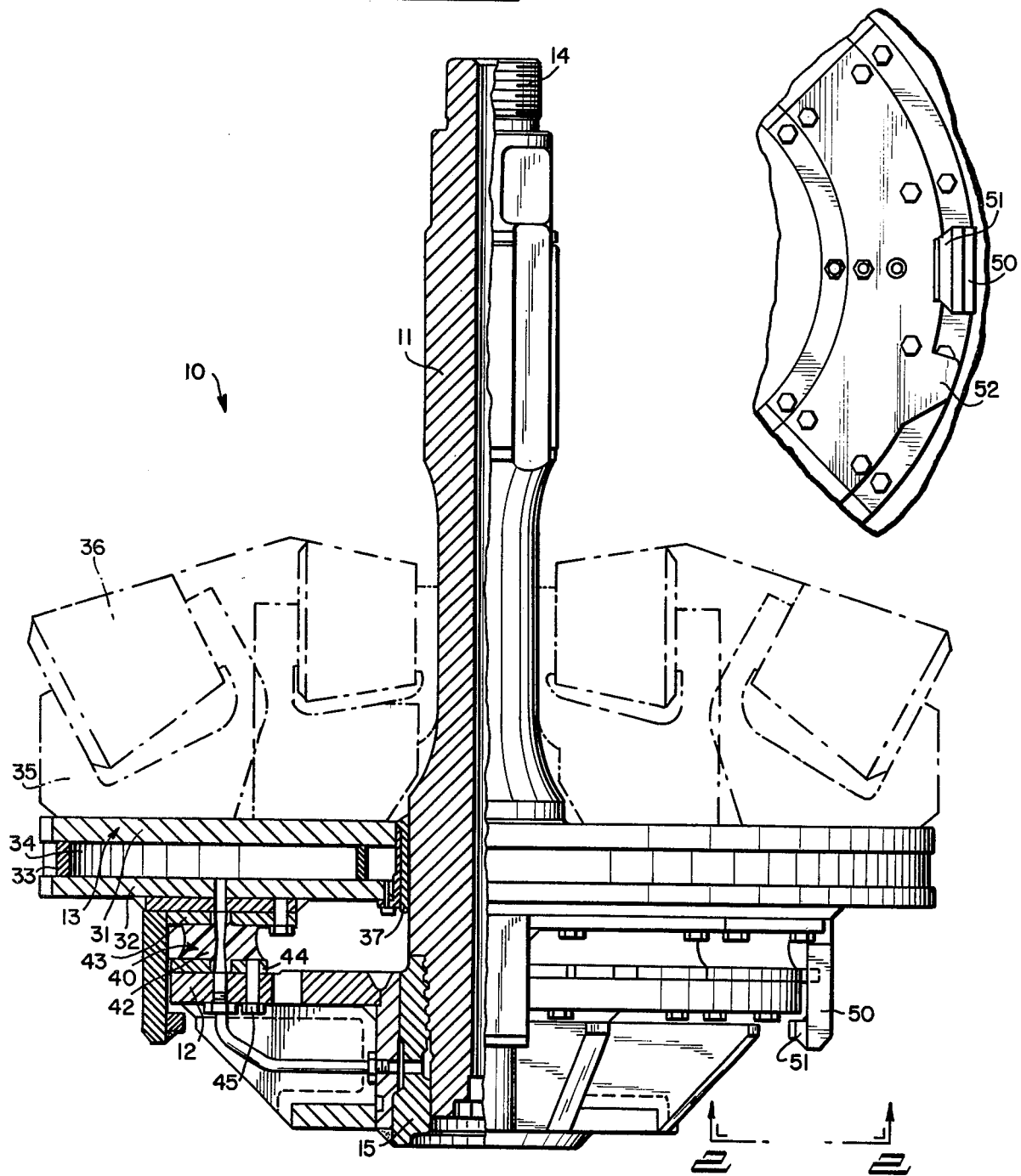

SAFETY MECHANISM FOR A RAISE DRILL

BACKGROUND OF THE INVENTION

1. Field of the Invention

The present invention relates generally to raise type earth boring drills and, more particularly, to raise drills having flexible connections between the drive stems and the main bit bodies.

2. Description of the Prior Art

A relatively large diameter hole may be provided between two locations in a mine by an operation commonly referred to as raise drilling. A raise drilling operation begins by drilling a small diameter pilot hole through the earth between the locations using a small diameter pilot bit. After the pilot hole is completed, the pilot bit is removed from the drill column and a large diameter raise bit is attached. The raise bit is then rotated and drawn along the pilot hole to enable the drill cutters to contact and disintegrate the earth formations surrounding the pilot hole, thereby enlarging the pilot hole to the desired size. In an exemplary embodiment, the pilot hole may be 11 inches in diameter and the reamed out hole may be six feet in diameter.

During a raise drilling operation, a tremendous amount of wear and stress is imposed upon the raise bit. The drive stem in particular is subjected to considerable wear due to abrasive contact with the surrounding earth formation and is also subject to considerable stress resulting from (a) tension due to the pulling force imparted to the drill, (b) twisting due to the torque applied to the drill, and (c) bending due to uneven loading around the circumference of the drill.

The advantages of having the drive stem removable are that the elements having a relatively short lifespan can be replaced, thereby extending the useful life of the bit, and the low profile of the separated components allows the raise bit to be transported through small drifts or passages.

The disadvantage of the replaceable drive stem is that a certain amount of down time is still required to remove and replace the stem. This non-operating time is costly and it is still preferable to obtain as long a running time as possible for each bit-stem combination.

One area that has not been sufficiently explored in raise drilling is the area relating to improving the operating life of a raise drill drive stem. A co-pending U.S. patent application, Ser. No. 961,038, entitled "An Improved Raise Drill", now Pat. No. 4,202,417 issued May 15, 1980, accomplishes this by providing a flexible shock absorbing connection between the bit body and the drive stem. This flexible connection functions to absorb the uneven bending and impact type loads acting on the bit body in order to prevent these loads from being transferred to the drive stem. The flexible connection consists of an elastomeric annular member bonded to the bit body base plate and a thrust plate which is integrally attached to the drive stem.

One concern with the shock absorbing connection is that a torque overload may break the bonded connections between the base plate and the thrust plate. If this were to occur, no torque would be applied to the bit body since all of the torque is transmitted through the flexible connection.

Another concern with the shock absorbing connection is that when the bit body is lowered in the enlarged hole, which becomes necessary at times, the body could become lodged in the hole while the drill column and drive stem are still being forced downwardly. This downward force could break the connection and the bit body would become separated from the drive stem. Should the drill column be lowered further and the bit body then become dislodged, the bit body would fall freely until it contacted the drive stem once again. In most instances, the drive stem would not be able to take the sudden load and the drill column would also break at some point and the bit body and drill column would fall to the hole bottom and be destroyed.

SUMMARY OF THE INVENTION

The present invention obviates the above-mentioned problems by providing a safety mechanism for limiting the amount of relative axial movement between the bit body and the drive stem.

In its broadest aspect, the invention includes a raise drill having a main bit body removably attached to a drive stem. The bit body has a plurality of roller cutters rotatively mounted thereon, and further includes a flexible coupling between two plates for absorbing the bending and impact loads acting on the bit body. The mechanism includes a safety lug attached to one of the mounting plates and extending axially over the other mounting plate to retain the other plate in case the flexible connection breaks away. The safety mechanism further includes a radial stop located on the other mounting plate for contacting the lug to impart a driving torque thereto.

The primary advantage of the present invention is that the safety mechanism functions to safeguard the axial motion of the bit body.

Another advantage of the present invention is that the safety mechanism can prevent the flexible connection from achieving an overloaded condition in the rotating direction which would destroy the connection.

Still another advantage of the present invention is that the safety mechanism would secure the bit body in case the flexible coupling does break away and also impart a driving torque thereto.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 1 is an elevational view, partially in section, of a raise drill utilizing a flexible connection between the bit body and the drive stem and a torque limiting mechanism of the present invention;

FIG. 2 is an enlarged fragmentary elevational view of the torque limiting mechanism of the present invention.

DESCRIPTION OF THE PREFERRED EMBODIMENT

Referring now to the drawings, FIG. 1 illustrates a raise drill reaming head, generally indicated by arrow 10, comprising a drive stem 11, a thrust plate 12, and a bit body 13. The upper end of the drive stem 11 is provided with a tapered thread 14 which is adapted to be threaded into a standard drill string through which the raise drill 10 is driven.

The thrust plate 12 is integrally connected to a threaded member 15 which is removably threaded to the lower end of the drive stem 11.

The bit body 13 is comprised mainly of a pair of parallel plates 31 and 32 rigidly secured to each other by a plurality of annular ribs 33 to form a frame. It should also be noted that a compartment 34 is formed by the above mentioned elements 31, 32 and 33.

The upper plate 31 has a plurality of saddles 35, some of which are shown in phantom, integrally mounted thereon for rotatively supporting a plurality of rolling cutters 36, some of which are also shown in phantom.

The bit body 13 further includes a central opening extending around the central shaft portion of the drive stem 11 for receiving an annular packing member 37 which is integrally connected to the plate 32. The thrust plate 12 and the bit body 13 are interconnected by means of an elastomeric element, generally indicated by arrow 40.

The elastomeric element 40 comprises a substantially toroidal element 42 coaxially positioned with respect to the drive stem 11. The toroidal element 42 is made of a polyurethane material which is sandwiched between a pair of plates 43 and 44 which are of a similar annular configuration. The toroidal element 42 is bonded to the plates 43 and 44 to form an integral unit. The plates 43 and 44 include a plurality of threaded bore holes which are adapted to receive a plurality of bolts 45 for connection to the thrust plate 12 and the plate 32 of the bit body 13.

In accordance with the present invention, means are provided to limit the relative axial movement between the thrust plate 12 and the bit body 13. As shown in FIGS. 1 and 2, these means comprise a pair of lugs 50 each rigidly secured to the bottom of plate 32. The lugs 50 further include flanges 51 extending from the bottom of the lugs 50 around the thrust plate 12. A clearance is provided between the flanges 51 and the thrust plate 12. During operation, should it become necessary to lower the drill column and raise drill down the bore hole already drilled, the lugs 50 and flanges 51 will assure that the bit body 13 will not separate from the thrust plate 12 should the bit body 13 become lodged within the bore hole and the bonded connection of the flexible connection severs. If the lugs 50 and flanges 51 were not present and the bit body 13 becomes lodged during this lowering operation, the downward force of the drill column and the drive stem 11 would act on the lodged bit body 13 which will tend to cause the elastomeric element 40 to lose its bond between the thrust plate 12 and the bit body 13. As mentioned above, should the elastomeric element 40 lose its bond and the thrust plate 12 become separated from the bit body 13, the lugs 50 and flanges 51 will engage the thrust plate 12 and prevent the two elements from becoming separated further.

As shown in FIG. 2, the thrust plate 12 further includes a pair of stops 52 each of which is adapted to contact a lug 50 on the one side thereof. The purpose of the stops 52 is to impart a driving torque to the lug 50 in order to rotatively drive the bit body 13 should the flexible coupling become severed.

As can be seen, the safety mechanism not only prevents the bit body 13 from being separated from the drive stem 11, but it also ensures that the bit body will be rotatively driven even if the flexible shock absorber becomes severed.

It should be noted that various modifications can be made to the assembly while still remaining within the purview of the following claims.

What is claimed is:

1. A raise drill for enlarging the diameter of a pilot hole comprising:

a drive stem having an upper end adapted to be connected to a drill column;

a thrust plate integrally secured to the lower end of said drive stem;

a bit body having a plurality of rolling cutters mounted thereon, said bit body further having a base plate contiguous to and above said thrust plate;

a flexible coupling interconnecting the thrust plate to the base plate; and safety means for drivingly securing the thrust plate to the base plate upon the severance of the flexible coupling, said safety means including retaining means for preventing relative axial movement between the thrust plate and the base plate upon severance of the flexible coupling, said retaining means including at least one lug having a flange secured to one of said plates for extending over and around the other of said plates with a small clearance therebetween, said retaining means further including auxiliary drive means for drivingly interconnecting the thrust plate to the base plate upon severance of the flexible coupling.

* * * * *